US011019453B2

(12) United States Patent
Guo

(10) Patent No.: US 11,019,453 B2
(45) Date of Patent: May 25, 2021

(54) METHOD AND APPARATUS FOR DETERMINING RELATIVE LOCATION

(71) Applicant: Advanced New Technologies Co., Ltd., Grand Cayman (KY)

(72) Inventor: Wei Guo, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/115,176

(22) Filed: Aug. 28, 2018

(65) Prior Publication Data

US 2018/0367950 A1 Dec. 20, 2018

Related U.S. Application Data

(63) Continuation of application No. PCT/CN2017/073913, filed on Feb. 17, 2017.

(30) Foreign Application Priority Data

Feb. 29, 2016 (CN) .......................... 201610112657.6

(51) Int. Cl.
*H04W 4/02* (2018.01)
*H04W 8/00* (2009.01)
(Continued)

(52) U.S. Cl.
CPC .......... *H04W 4/023* (2013.01); *G01S 5/0072* (2013.01); *H04L 29/08* (2013.01); *H04W 4/20* (2013.01);
(Continued)

(58) Field of Classification Search
CPC ....... H04W 4/023; H04W 8/005; H04W 4/20; H04W 8/245; H04L 29/08; H04L 67/18; G01S 5/0072
See application file for complete search history.

(56) References Cited

U.S. PATENT DOCUMENTS

| 9,763,043 B2* | 9/2017 | Larsen | ................ H04W 64/006 |
| 2003/0080992 A1* | 5/2003 | Haines | .................. H04W 99/00 715/734 |

(Continued)

FOREIGN PATENT DOCUMENTS

| CN | 102223602 | 10/2011 |
| CN | 102831113 | 12/2012 |

(Continued)

OTHER PUBLICATIONS

European Extended Search Report in European Patent Application No. 17759125.2, dated Oct. 1, 2019, 9 pages.

(Continued)

*Primary Examiner* — Soe Hlaing
(74) *Attorney, Agent, or Firm* — Fish & Richardson P.C.

(57) ABSTRACT

Reference location information associated with the first terminal device is generated by a first terminal device. The reference location information is sent to a second terminal device, where the second terminal device configures second terminal device location information based on the reference location information and uses the location information as marked location information. The marked location information transmitted by the second terminal device is received and relative locations of the first terminal device and the second terminal device are determined based on the reference location information and the received marked location information.

17 Claims, 11 Drawing Sheets

(51) Int. Cl.
*H04W 8/24* (2009.01)
*H04W 4/20* (2018.01)
*G01S 5/00* (2006.01)
*H04L 29/08* (2006.01)

(52) U.S. Cl.
CPC ........... *H04W 8/005* (2013.01); *H04W 8/245* (2013.01); *H04L 67/18* (2013.01)

(56) References Cited

U.S. PATENT DOCUMENTS

| | | | |
|---|---|---|---|
| 2008/0101277 A1* | 5/2008 | Taylor | G01S 5/0289 370/328 |
| 2008/0254811 A1 | 10/2008 | Stewart | |
| 2013/0226444 A1 | 8/2013 | Johansson et al. | |

FOREIGN PATENT DOCUMENTS

| | | |
|---|---|---|
| CN | 103702281 | 4/2014 |
| CN | 103905986 | 7/2014 |
| CN | 104333564 | 2/2015 |
| CN | 104333845 | 2/2015 |
| CN | 104468335 | 3/2015 |
| CN | 104486464 | 4/2015 |
| JP | H085394 | 1/1996 |
| JP | H09178833 | 7/1997 |
| JP | 2002165258 | 6/2002 |
| JP | 2003121194 | 4/2003 |
| JP | 2006276380 | 10/2006 |
| JP | 2007150768 | 6/2007 |
| JP | 2008182612 | 8/2008 |
| JP | 2012015636 | 1/2012 |
| JP | 2014164207 | 9/2014 |
| TW | 200602660 | 1/2006 |
| WO | WO 2007031844 | 3/2007 |
| WO | WO 2010150323 | 12/2010 |
| WO | WO 2015110019 | 7/2015 |
| WO | WO-2015110019 A1 * 7/2015 ............ H04W 76/10 |  |

OTHER PUBLICATIONS

International Search Report by the International Searching Authority issued in International Application No. PCT/CN2017/073913 dated May 12, 2017; 8 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

* cited by examiner

METHOD AND APPARATUS FOR DETERMINING RELATIVE LOCATION

CROSS-REFERENCE TO RELATED APPLICATIONS

This application is a continuation of PCT Application No. PCT/CN2017/073913, filed on Feb. 17, 2017, which claims priority to Chinese Patent Application No. 201610112657.6, filed on Feb. 29, 2016, and each application is hereby incorporated by reference in its entirety.

TECHNICAL FIELD

The present application relates to the field of computer technologies, and in particular, to a method and an apparatus for determining a relative location.

BACKGROUND

With the development of information technologies, a user not only can obtain, by using a terminal device, various services provided by an online system (for example, a website), but also can interact with other users by using the terminal device.

Currently, as a common terminal device interaction method, location sharing based on a positioning service enables terminal devices to share locations with each other, so that users can learn the locations of other users. For a current location sharing method, a location determined based on a positioning service is an absolute location. Terminal devices need to keep a smooth network connection to a server providing location data. Due to limited precision of the positioning data provided by the positioning service, terminal devices close to each other may obtain the same absolute location. Consequently, relative locations of the terminal devices cannot be differentiated.

In the existing technology, a specific device (for example, an external location sensor) is usually configured for each terminal device, to differentiate relative locations of terminal devices by using the specific device.

However, for the method in the existing technology, a relative location of each terminal device can be determined only by using the specific device. Without the specific device, the relative location of each terminal device cannot be determined. Apparently, such a method is limited.

SUMMARY

Implementations of the present application provide a method and an apparatus for determining a relative location, to resolve a problem in the existing technology that determining relative locations of terminal devices is greatly limited.

An implementation of the present application provides a method for determining a relative location, including: generating, by a first terminal device, reference location information of the first terminal device; sending the reference location information to a second terminal device, so that the second terminal device sets location information of the second terminal device based on the reference location information, and uses the location information as marked location information; receiving the marked location information sent by the second terminal device; and determining relative locations of the first terminal device and the second terminal device based on the reference location information and the received marked location information.

An implementation of the present application further provides a method for determining a relative location, including: receiving, by a second terminal device, reference location information sent by a first terminal device; setting location information of the second terminal device based on the reference location information, and using the location information as marked location information; and sending the marked location information to the first terminal device, so that the first terminal device determines relative locations of the first terminal device and the second terminal device based on the reference location information of the first terminal device and the marked location information of the second terminal device.

An implementation of the present application provides an apparatus for determining a relative location, including: a reference location module, configured to generate reference location information of a first terminal device; a sending module, configured to send the reference location information to a second terminal device, so that the second terminal device sets location information of the second terminal device based on the reference location information, and uses the location information as marked location information; a receiving module, configured to receive the marked location information sent by the second terminal device; and a location determining module, configured to determine relative locations of the first terminal device and the second terminal device based on the reference location information and the received marked location information.

An implementation of the present application further provides an apparatus for determining a relative location, including: a receiving module, configured to receive reference location information sent by a first terminal device; a marked location module, configured to set location information of a second terminal device based on the reference location information, and use the location information as marked location information; and a sending module, configured to send the marked location information to the first terminal device, so that the first terminal device determines relative locations of the first terminal device and the second terminal device based on the reference location information of the first terminal device and the marked location information of the second terminal device.

The implementations of the present application provide the method and apparatus for determining a relative location. In the method, to determine relative locations of a plurality of terminal devices, the first terminal device that initiates relative location determining first generates the reference location information of the first terminal device, and sends the reference location information to the second terminal device, so that the second terminal device can use a location of the first terminal device as a reference location, to determine the marked location information of the second terminal device. Then the second terminal device sends the marked location information to the first terminal device, so that the first terminal device can determine the relative locations of the first terminal device and the second terminal device based on the reference location information of the first terminal device and the marked location information of the second terminal device. Different from the existing technology, in the method described in the present application, practicability of determining relative locations of a plurality of terminal devices by the terminal devices can be effectively improved without a need of using an external location sensing device.

BRIEF DESCRIPTION OF DRAWINGS

The accompanying drawings here are used to provide further understanding of the present application, and constitute a part of the present application. Example implementations of the present application and descriptions of the implementations are used to explain the present application, and do not constitute an improper limitation to the present application. In the accompanying drawings.

DESCRIPTION OF IMPLEMENTATIONS

To make the objectives, technical solutions, and advantages of the present application clearer, the following describes the technical solutions of the present application with reference to the specific implementations and the corresponding accompanying drawings of the present application. The described implementations are some, rather than all, of the implementations of the present application. All other implementations obtained by a person of ordinary skill in the art based on the implementations of the present application without creative efforts shall fall within the protection scope of the present application.

As described above, if relative locations of a plurality of terminal devices need to be determined by using a location service in the existing technology, only absolute locations of the terminal devices can be obtained, and the obtained absolute locations of the plurality of terminal devices may be the same due to location service precision. Therefore, as shown in FIG. 1, an implementation of the present application provides a method for determining a relative location, to obtain the relative locations of the plurality of terminal devices without a need of using a specific device.

Figure 1:
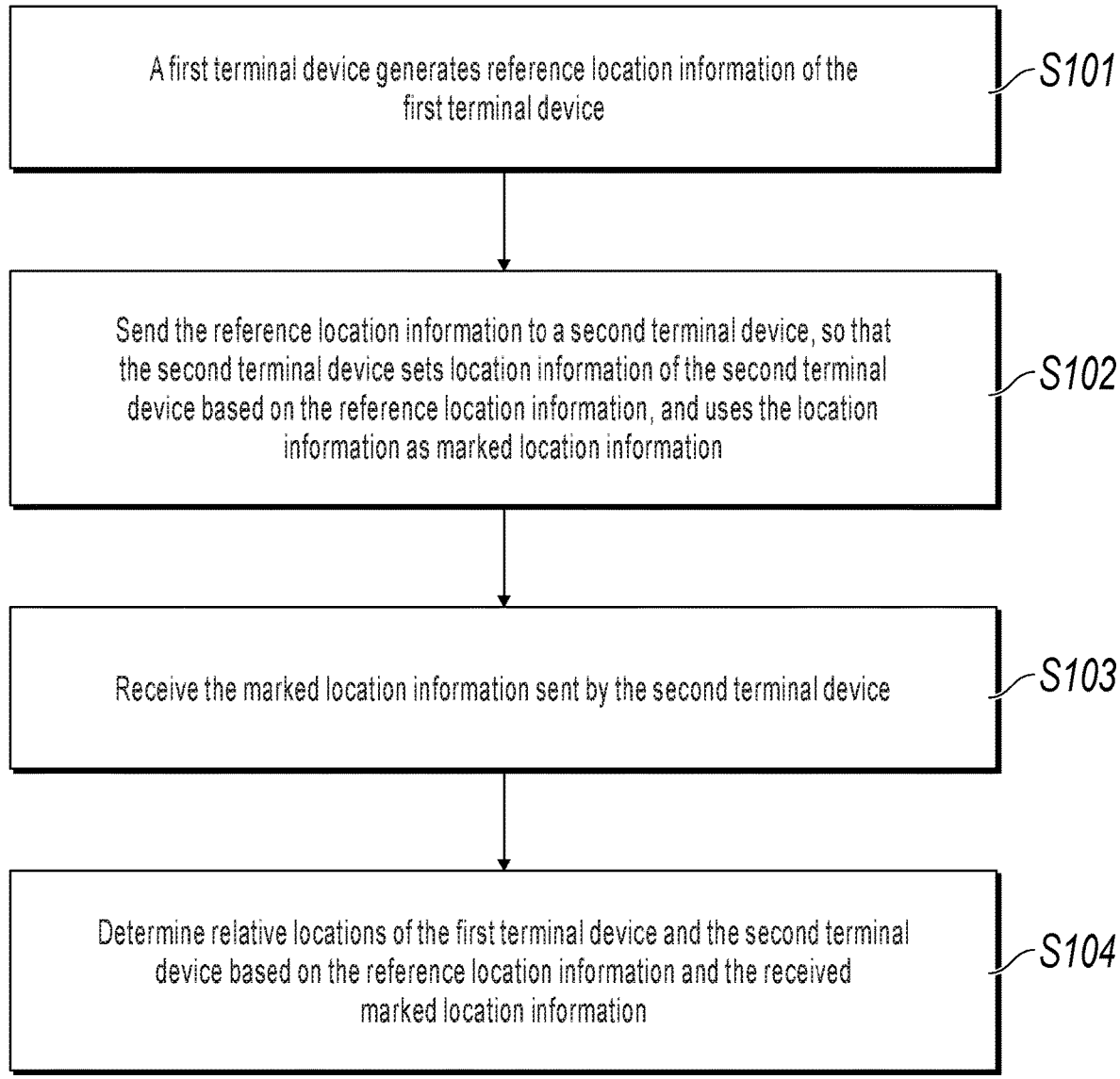
FIG. 1 is a schematic diagram illustrating a process of determining a relative location based on a first terminal device side, according to an implementation of the present application.

FIG. 1 illustrates a process of determining a relative location, according to an implementation of the present application. The process includes the following steps.

S101. A first terminal device generates reference location information of the first terminal device.

The first terminal device includes but is not limited to a computer terminal device, or a mobile device such as a smartphone, a tablet, or a notebook computer. In this implementation of the present application, the first terminal device can be considered as an initiator of relative positioning.

The reference location information reflects a relative location of the first terminal device. It is worthwhile to note that an absolute location of the first terminal device does not need to be accurately obtained because a relative location of each terminal device is determined in this implementation of the present application. In a method of the present application, the first terminal device can be in due north, due south, etc. Or in another method of the present application, the first terminal device can be in a central location in a positioning interface. Certainly, the described methods do not constitute a limitation on the present application.

A location corresponding to the reference location information generated by the first terminal device is used by another terminal device for reference, to determine a location of each terminal device. Therefore, after generating the reference location information of the first terminal device, the first terminal device needs to notify another terminal device. To be specific, the following step S102 is performed.

S102. Send the reference location information to a second terminal device, so that the second terminal device sets location information of the second terminal device based on the reference location information, and uses the location information as marked location information.

The second terminal device includes but is not limited to a computer terminal device, or a mobile device such as a smartphone, a tablet, or a notebook computer. In this implementation of the present application, the second terminal device can be considered as a participant of the positioning for a relative location.

After receiving the reference location information of the first terminal device, the second terminal device can determine a current location of the first terminal device, and use the location as a reference location to determine a location of the second terminal device. The second terminal device determines the location information of the second terminal device, and the location information of the second terminal device marks a current location of the second terminal device. Therefore, the location information of the second terminal device can be used as the marked location information.

Certainly, it is worthwhile to note that the location information of the second terminal device can be set by a user who uses the second terminal device, or can be set by the second terminal device (for example, under support of some applications, the second terminal device can perform location interaction with the first terminal device by using Bluetooth, infrared, etc., to determine the location information of the second terminal device, which is not limited here).

S103. Receive the marked location information sent by the second terminal device.

The second terminal device sends the location information (that is, the marked location information) of the second terminal device to the first terminal device, so that the first terminal device determines relative locations of the terminal devices. To be specific, the following step S104 is performed.

S104. Determine relative locations of the first terminal device and the second terminal device based on the reference location information and the received marked location information.

As described above, the reference location information reflects the current location of the first terminal device, and the marked location information reflects the current location of the second terminal device. Therefore, the relative locations of the first terminal device and the second terminal device can be determined.

In the steps above, to determine relative locations of a plurality of terminal devices, the first terminal device that initiates relative location determining first generates the reference location information of the first terminal device, and sends the reference location information to the second terminal device, so that the second terminal device can use the location of the first terminal device as the reference location, to determine the marked location information of the second terminal device. Then the second terminal device sends the marked location information to the first terminal device, so that the first terminal device can determine the relative locations of the first terminal device and the second terminal device based on the reference location information of the first terminal device and the marked location information of the second terminal device. Different from the existing technology, in the method described in the present application, practicability of determining relative locations of a plurality of terminal devices by the terminal devices can be effectively improved without a need of using an external location sensing device.

For the method shown in FIG. 1, it is worthwhile to note that, in actual applications, terminal devices that need to determine relative locations of each other are usually in a same group. Therefore, sending the reference location information to the second terminal device in step S102 includes: determining, by the first terminal device, a group that includes the first terminal device, and sending the reference location information to each second terminal device in the group. In other words, the first terminal device initiates a relative location determining operation in the group that includes the first terminal device.

Certainly, the group can be an instant messaging group established by using a corresponding application, can be a local area network group established for terminal devices in the same local area network (for example, a WiFi network), or can be established on a network service platform under support of a corresponding server. In addition, the group can be established by the first terminal device, the second terminal device, or a network device (for example, a server providing a network service platform, or a router providing a local area network), which constitutes no limitation on the present application here.

In the preceding group, each second terminal device receives the reference location information from the first terminal device, and each second terminal device marks location information of the second terminal device, and provides the location information for the first terminal device. As such, the first terminal device can determine relative locations of all terminal devices (including the first terminal device) in the group. Therefore, the first terminal device needs to notify each second terminal device in the group of the relative locations of all the terminal devices, so that each second terminal device can learn the relative locations of all the terminal devices. Therefore, in this implementation of the present application, the method further includes: determining, by the first terminal device, relative locations of the first terminal device and each second terminal device in the group, based on the received marked location information, and sending the determined relative location of each second terminal device to all second terminal devices in the group.

All terminal devices in a group can learn relative locations of each other in such method.

In actual applications, the first terminal device and the second terminal device can determine respective location information in the following methods.

First Method:

The first terminal device and the second terminal device can determine the reference location information and the marked location information by using corresponding positioning interfaces.

The generating, by a first terminal device, reference location information of the first terminal device includes: generating, by the first terminal device in a positioning interface including a coordinate system, the reference location information of the first terminal device based on an origin of the coordinate system, where the first terminal device uses the origin of the coordinate system as a reference location of the first terminal device.

The coordinate system is usually two-dimensional. In some special application scenarios, the coordinate system can be three-dimensional. For example, the three-dimensional coordinate system can present spatial relative locations of terminal devices when the terminal devices are on different floors of the same building. Certainly, it constitutes no limitation on the present application here.

Figure 2A:
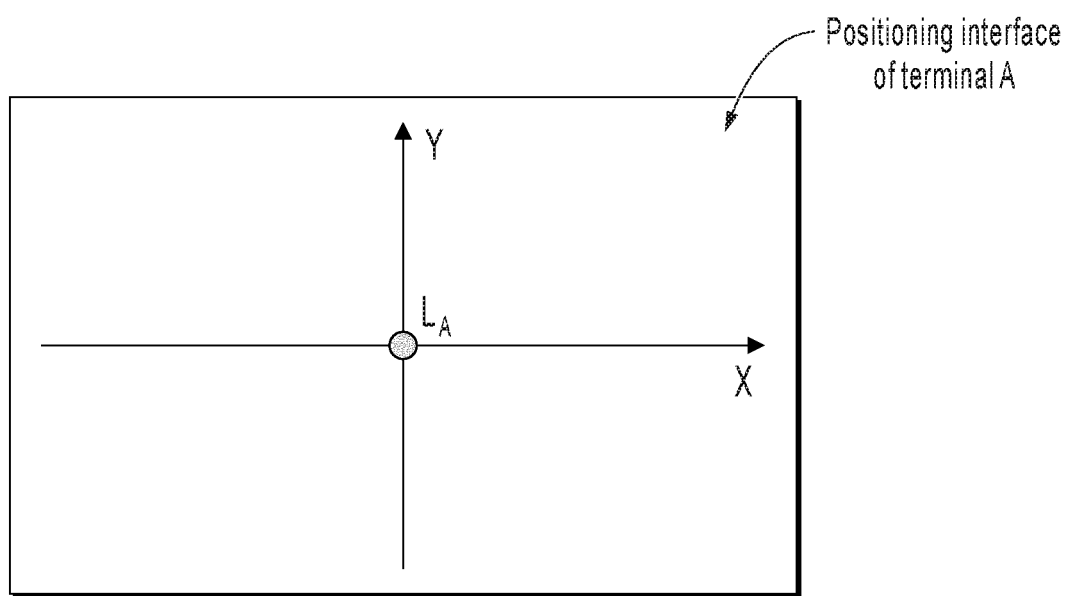
FIG. 2a to FIG. 2d are schematic diagrams illustrating a positioning interface, according to an implementation of the present application.

A positioning interface including a two-dimensional coordinate system is used as an example. FIG. 2a shows a positioning interface displayed by terminal device A (that is, the first terminal device). It can be seen from FIG. 2a that the positioning interface includes a two-dimensional coordinate system. In such case, terminal device A can determine an origin of the two-dimensional coordinate system as a reference location of terminal device A (that is, point LA). To be specific, terminal device A generates reference location information of terminal device A based on the origin of the two-dimensional coordinate system.

After generating the reference location information of the first terminal device, the first terminal device sends the reference location information to the second terminal device. To be specific, sending the reference location information to the second terminal device includes: sending a positioning interface including the reference location information to the second terminal device.

As such, the second terminal device can mark a location of the second terminal device in the coordinate system of the positioning interface based on the positioning interface sent by the first terminal device, to set the marked location information, and feed back the marked location information to the first terminal device. Based on this, receiving the marked location information sent by the second terminal device includes: receiving a positioning interface that is fed back by the second terminal device and that includes the marked location information of the second terminal device.

Still in the preceding example, if terminal device A is in the same group as terminal device B1 and terminal device B2, terminal device A separately sends the positioning interface shown in FIG. 2a to terminal device B1 and terminal device B2. Based on this, terminal device B1 and terminal device B2 set respective marked location information in the coordinate system based on the positioning interface shown in FIG. 2a, and feed back the respective marked location information to terminal device A.

Figure 2B:
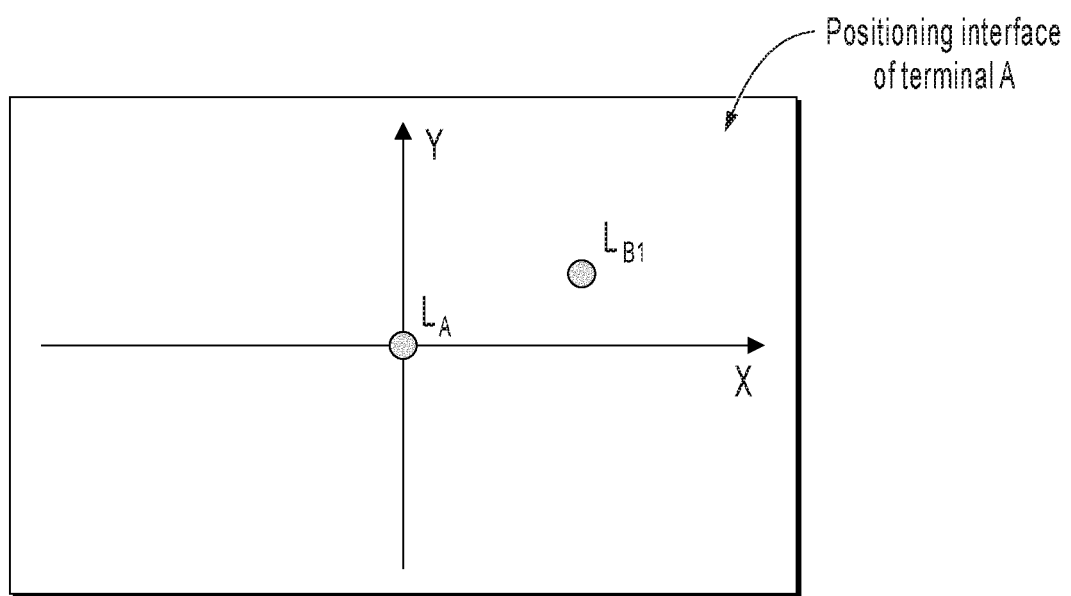

As shown in FIG. 2b, if terminal device A receives a positioning interface fed back by terminal device B1, point LB1 shown in FIG. 2b is a location that is set by terminal device B1 in the positioning interface.

Figure 2C:
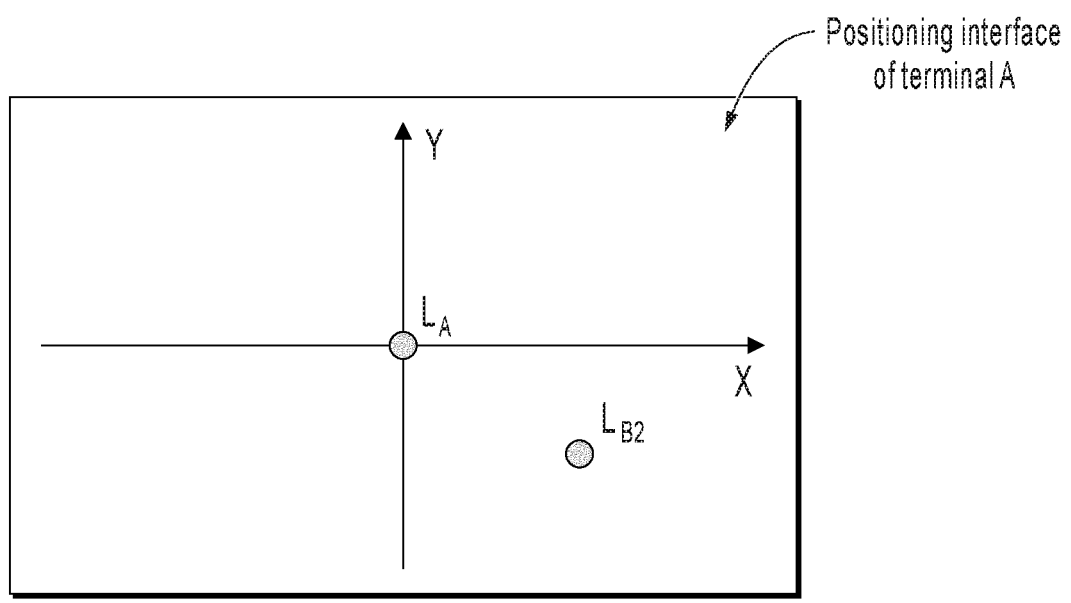

As shown in FIG. 2c, if terminal device A receives a positioning interface fed back by terminal device B2, point LB2 shown in FIG. 2c is a location that is set by terminal device B2 in the positioning interface.

Figure 2D:
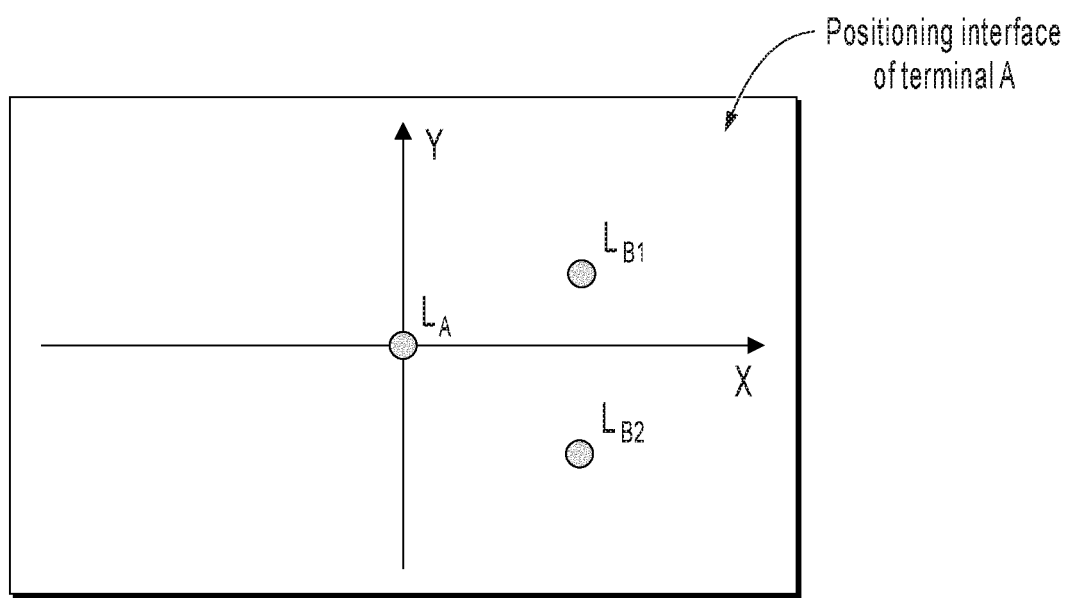

Based on this, as shown in FIG. 2d, terminal device A can determine relative locations of the three terminal devices in the same group based on the reference location (point LA)

of terminal device A and the received marked location information (point LB1 and point LB2) of terminal device B1 and terminal device B2.

Certainly, it is worthwhile to note that, in addition to the locations, the two-dimensional coordinate system shown in FIG. 2a to FIG. 2d can also display coordinates of the locations. For example, coordinates of point LA are (0, 0), and coordinates of point LB1 are (1, 1). It constitutes no limitation on the present application here.

Second Method:

Locations can be displayed by directly using a positioning interface (without a coordinate system) in addition to using a coordinate system.

The generating, by a first terminal device, reference location information of the first terminal device includes: generating, by the first terminal device, the reference location information of the first terminal device in a positioning interface.

The sending the reference location information to a second terminal device includes: sending the positioning interface to the second terminal device.

The receiving the marked location information sent by the second terminal device includes: receiving a positioning interface that is fed back by the second terminal device and that includes the marked location information of the second terminal device.

In other words, the first terminal device can determine a reference location of the first terminal device in the positioning interface in the method, to generate the reference location information. In actual applications, the first terminal device can use, based on an operation performed by a user in the positioning interface, a location selected by the user as the reference location of the first terminal device, to generate the reference location information. In another actual application, the first terminal device can use a predefined default location as the reference location of the first terminal device. For example, the default location can be a central location of the positioning interface. It constitutes no limitation on the present application here.

Correspondingly, based on the reference location information of the first terminal device, the second terminal device can also set the marked location information of the second terminal device in the positioning interface sent by the first terminal device.

After receiving the positioning interface fed back by the second terminal device, the first terminal device can further determine the relative locations of the first terminal device and the second terminal device.

Figure 3A:
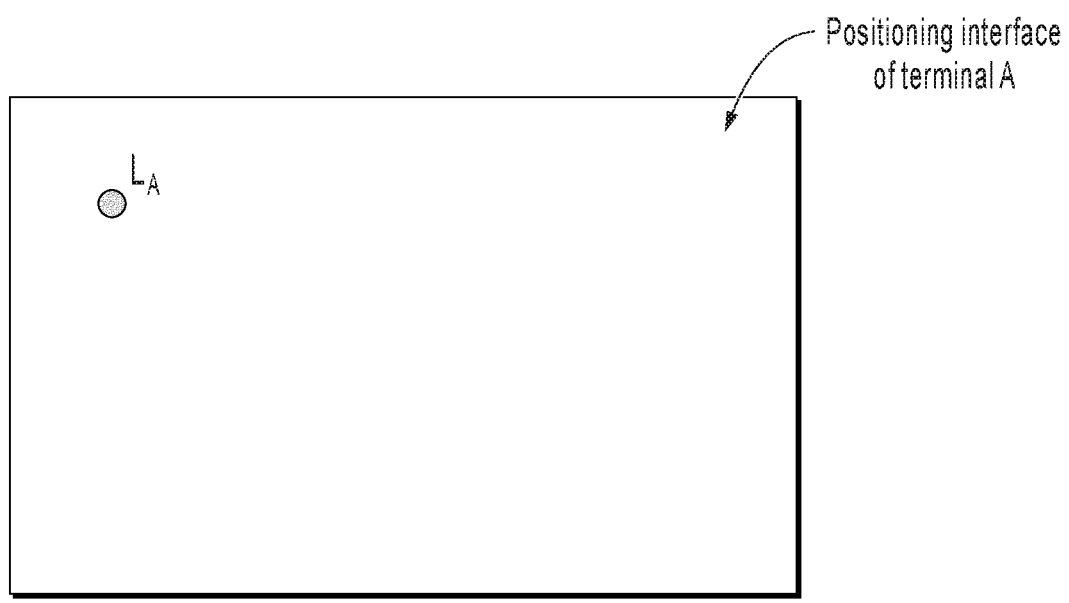
FIG. 3a and FIG. 3b are schematic diagrams illustrating another positioning interface, according to an implementation of the present application.

For example, as shown in FIG. 3a, the first terminal device generates the reference location information based on the operation performed by the user in the positioning interface. To be specific, point LA in FIG. 3a is a reference location of terminal device A. Similar to the preceding example, if terminal device A is in the same group as terminal device B1 and terminal device B2, terminal device A separately sends a positioning interface including the reference location information to terminal device B1 and terminal device B2, and receives positioning interfaces that are fed back by terminal device B1 and terminal device B2 that both include marked location information. Eventually, as shown in FIG. 3b, terminal device A determines relative locations of all terminal devices in the group.

In conclusion, all terminal devices can conveniently set respective locations in the preceding two methods, and intuitively display all locations. Therefore, a subsequent operation can be performed after relative locations of terminal devices are determined. The method further includes: transferring information between the terminal devices in a specific sequence based on the relative locations of the terminal devices; or displaying a specific image on the terminal devices through screen combination based on the relative locations of the terminal devices.

Figure 3B:
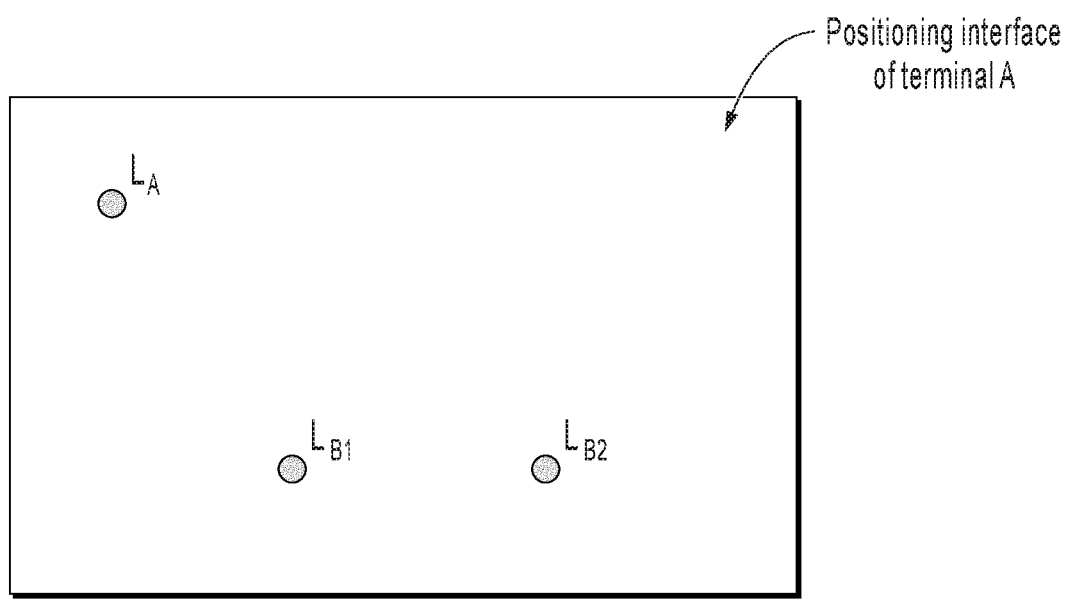

For example, based on the relative location shown in FIG. 3b, if terminal device A can send information to terminal device B1, terminal device B1 needs to transmit the information to terminal device B2 after receiving the information, and then terminal device B2 needs to transmit the information to terminal device A. Or, for example, based on the relative location shown in FIG. 2d, the three terminal devices can display a complete image through screen combination. As such, the images displayed on the three terminal devices can form a complete image. The preceding example constitutes no limitation on the present application.

Figure 4:
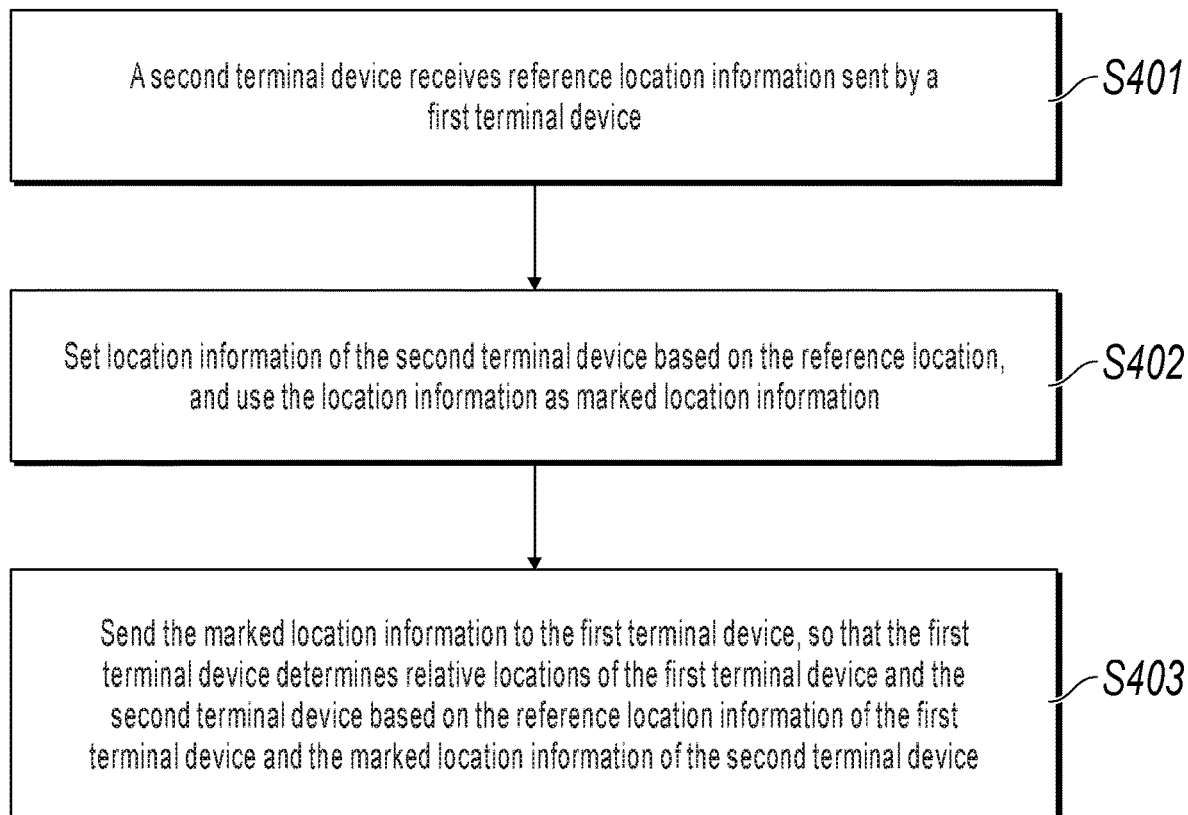
FIG. 4 is a schematic diagram illustrating a process of determining a relative location based on a second terminal device side, according to an implementation of the present application.

The previous content is described from a first terminal device side. As shown in FIG. 4, for a second terminal device, an implementation of the present application further provides a method for determining a relative location.

A process of determining a relative location shown in FIG. 4 includes the following steps:

S401. A second terminal device receives reference location information sent by a first terminal device.

S402. Set location information of the second terminal device based on the reference location information, and use the location information as marked location information.

S403. Send the marked location information to the first terminal device, so that the first terminal device determines relative locations of the first terminal device and the second terminal device based on the reference location information of the first terminal device and the marked location information of the second terminal device.

By using the preceding steps, the second terminal device can conveniently determine the relative locations of the second terminal device and the first terminal device. Certainly, similar to the previously described content, when a plurality of second terminal devices and the first terminal device are in the same group, the second terminal device further receives marked location information of other second terminal devices sent by the first terminal device, so that each second terminal device in the group can determine relative locations of all terminal devices in the group. Details are omitted here for simplicity.

Similarly, if the first terminal device sends a positioning interface including a coordinate system to the second terminal device, the receiving, by a second terminal device, reference location information sent by a first terminal device includes: receiving, by the second terminal device, the positioning interface that is sent by the first terminal device and that includes the coordinate system. An origin of the coordinate system is used as a reference location of the first terminal device.

The setting location information of the second terminal device based on the reference location information includes: receiving, by the second terminal device, an operation instruction of a user in the positioning interface; using, as a marked location of the second terminal device, a location selected by the user in the coordinate system in the positioning interface; and generating the marked location information.

The sending the marked location information to the first terminal device includes: sending a positioning interface including the marked location information to the first terminal device.

If the first terminal device sends a positioning interface (without a coordinate system) to the second terminal device, the receiving, by a second terminal device, reference location information sent by a first terminal device includes: receiving, by the second terminal device, a positioning interface that is sent by the first terminal device and that includes the reference location information.

The setting location information of the second terminal device based on the reference location information includes: receiving an operation instruction of a user in the positioning interface; using, as a marked location of the second terminal device, a location selected by the user in the positioning interface; and generating the marked location information.

The sending the marked location information to the first terminal device includes: sending a positioning interface including the marked location information to the first terminal device.

Content of the preceding two methods is similar to the previously described content (content corresponding to FIG. 2a to FIG. 2d and FIG. 3a to FIG. 3b). Details are omitted here for simplicity.

Figure 5:
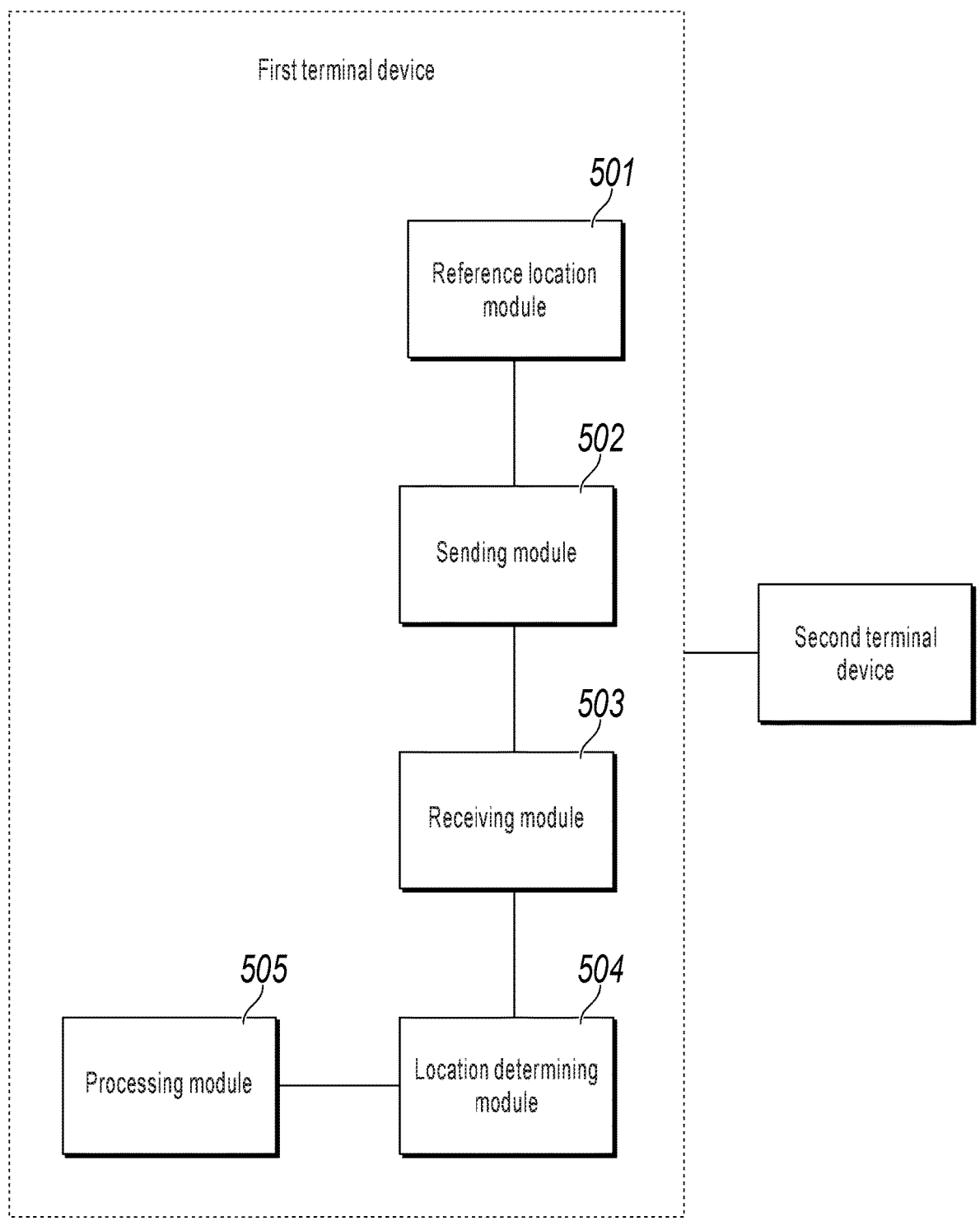
FIG. 5 is a schematic structural diagram illustrating an apparatus for determining a relative location based on a first terminal device side, according to an implementation of the present application.

The implementations of the present application provide the preceding methods for determining a relative location. As shown in FIG. 5, based on the same idea, an implementation of the present application further provides an apparatus for determining a relative location.

The apparatus for determining a relative location in FIG. 5 includes: a reference location module 501, configured to generate reference location information of a first terminal device; a sending module 502, configured to send the reference location information to a second terminal device, so that the second terminal device sets location information of the second terminal device based on the reference location information, and uses the location information as marked location information; a receiving module 503, configured to receive the marked location information sent by the second terminal device; and a location determining module 504, configured to determine relative locations of the first terminal device and the second terminal device based on the reference location information and the received marked location information.

In this implementation of the present application, the sending module 502 is configured to: determine a group including the first terminal device; and send the reference location information to each second terminal device in the group.

Based on this, the location determining module 504 is further configured to: determine relative locations of the first terminal device and each second terminal device in the group based on the received marked location information; and send the determined relative location of each second terminal device to all second terminal devices in the group.

In addition, in a method of this implementation of the present application, the reference location module 501 is configured to generate, in a positioning interface including a coordinate system, the reference location information of the first terminal device based on an origin of the coordinate system, where the first terminal device uses the origin of the coordinate system as a reference location of the first terminal device; the sending module 502 is configured to send a positioning interface including the reference location information to the second terminal device; and the receiving module 503 is configured to receive a positioning interface that is fed back by the second terminal device and that includes the marked location information of the second terminal device.

In another method of this implementation of the present application, the reference location module 501 is configured to generate the reference location information of the first terminal device in a positioning interface; the sending module 502 is configured to send the positioning interface to the second terminal device; and the receiving module 503 is configured to receive a positioning interface that is fed back by the second terminal device and that includes the marked location information of the second terminal device.

Certainly, in actual applications, the apparatus further includes: a processing module 505, configured to: transfer information between the terminal devices in a specific sequence based on the relative locations of the terminal devices; or display a specific image on the terminal devices through screen combination of images from different terminal devices based on the relative locations of the terminal devices.

Figure 6:
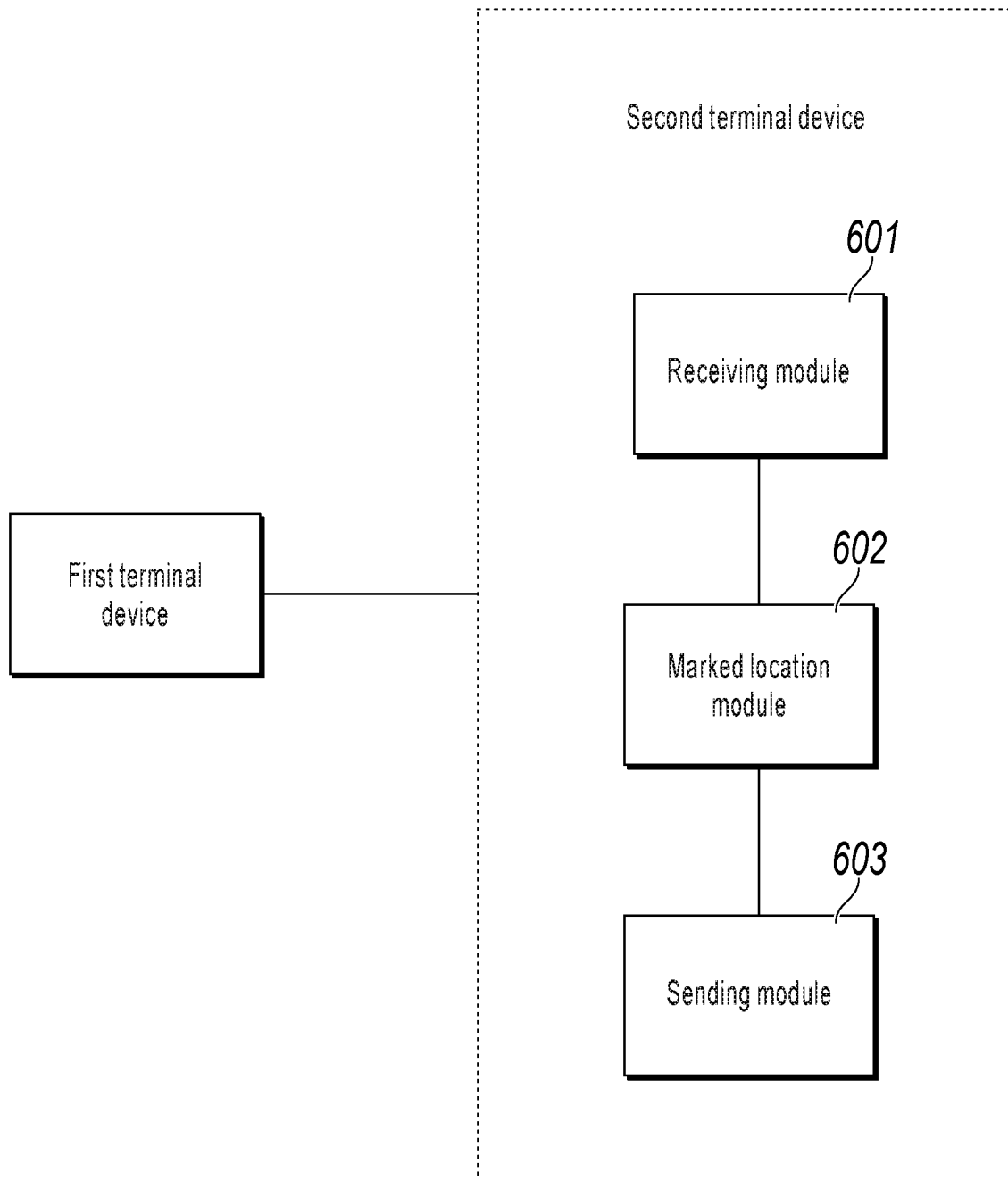
FIG. 6 is a schematic structural diagram illustrating an apparatus for determining a relative location based on a second terminal device side, according to an implementation of the present application.

In addition, an implementation of the present application further provides an apparatus for determining a relative location. As shown in FIG. 6, the apparatus includes: a receiving module 601, configured to receive reference location information sent by a first terminal device; a marked location module 602, configured to set location information of a second terminal device based on the reference location information, and use the location information as marked location information; and a sending module 603, configured to send the marked location information to the first terminal device, so that the first terminal device determines relative locations of the first terminal device and the second terminal device based on the reference location information of the first terminal device and the marked location information of the second terminal device.

In addition, in a method of this implementation of the present application, the receiving module 601 is configured to receive a positioning interface that is sent by the first terminal device and that includes a coordinate system, where an origin of the coordinate system is used as a reference location of the first terminal device; the marked location module 602 is configured to: receive an operation instruction of a user in the positioning interface; use, as a marked location of the second terminal device, a location selected by the user in the coordinate system in the positioning interface, and generate the marked location information; and the sending module 603 is configured to send a positioning interface including the marked location information to the first terminal device.

In another method of this implementation of the present application, the receiving module 601 is configured to receive a positioning interface that is sent by the first terminal device and that includes the reference location information; the marked location module 602 is configured to: receive an operation instruction of a user in the positioning interface; use, as a marked location of the second terminal device, a location selected by the user in the positioning interface; and generate the marked location information; and the sending module 603 is configured to send a positioning interface including the marked location information to the first terminal device.

In typical configuration, a computing device includes one or more processors (CPU), an input/output interface, a network interface, and a memory.

The memory can include a non-persistent storage, a random access memory (RAM), a nonvolatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can implement information storage by using any method or technology. Information can be a computer readable instruction, a data structure, a program module, or other data. A computer storage medium includes but is not limited to a phase change memory (PRAM), a static random access memory (SRAM), a dynamic random access memory (DRAM), a random access memory (RAM) of another type, a read-only memory, an electrically erasable programmable read-only memory (EEPROM), a flash memory or another memory technology, a compact disc read-only memory (CD-ROM), a digital versatile disc (DVD), or another optical storage, a cassette, a cassette magnetic disk storage, or another magnetic storage device or any other non-transmission medium. The computer storage medium can be configured to store information that can be accessed by the computing device. Based on the definition in the present specification, the computer readable medium does not include transitory computer-readable media (transitory computer-readable media), for example, a modulated data signal and carrier.

It is worthwhile to further note that the terms "include", "comprise", or their any other variant is intended to cover a non-exclusive inclusion, so that a process, a method, an article, or a device that includes a list of elements not only includes those elements but also includes other elements which are not expressly listed, or further includes elements inherent to such process, method, article, or device. An element preceded by "includes a . . . " does not, without more constraints, preclude the existence of additional identical elements in the process, method, article, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a magnetic disk storage, a CD-ROM, and an optical memory) that include computer-usable program code.

The previous descriptions are merely implementations of the present application, and are not intended to limit the present application. For a person skilled in the art, the present application can have various modifications and changes. Any modifications, equivalent substitutions, improvements, etc. made in the spirit and principle of the present application shall fall in the scope of the claims in the present application.

Figure 7:
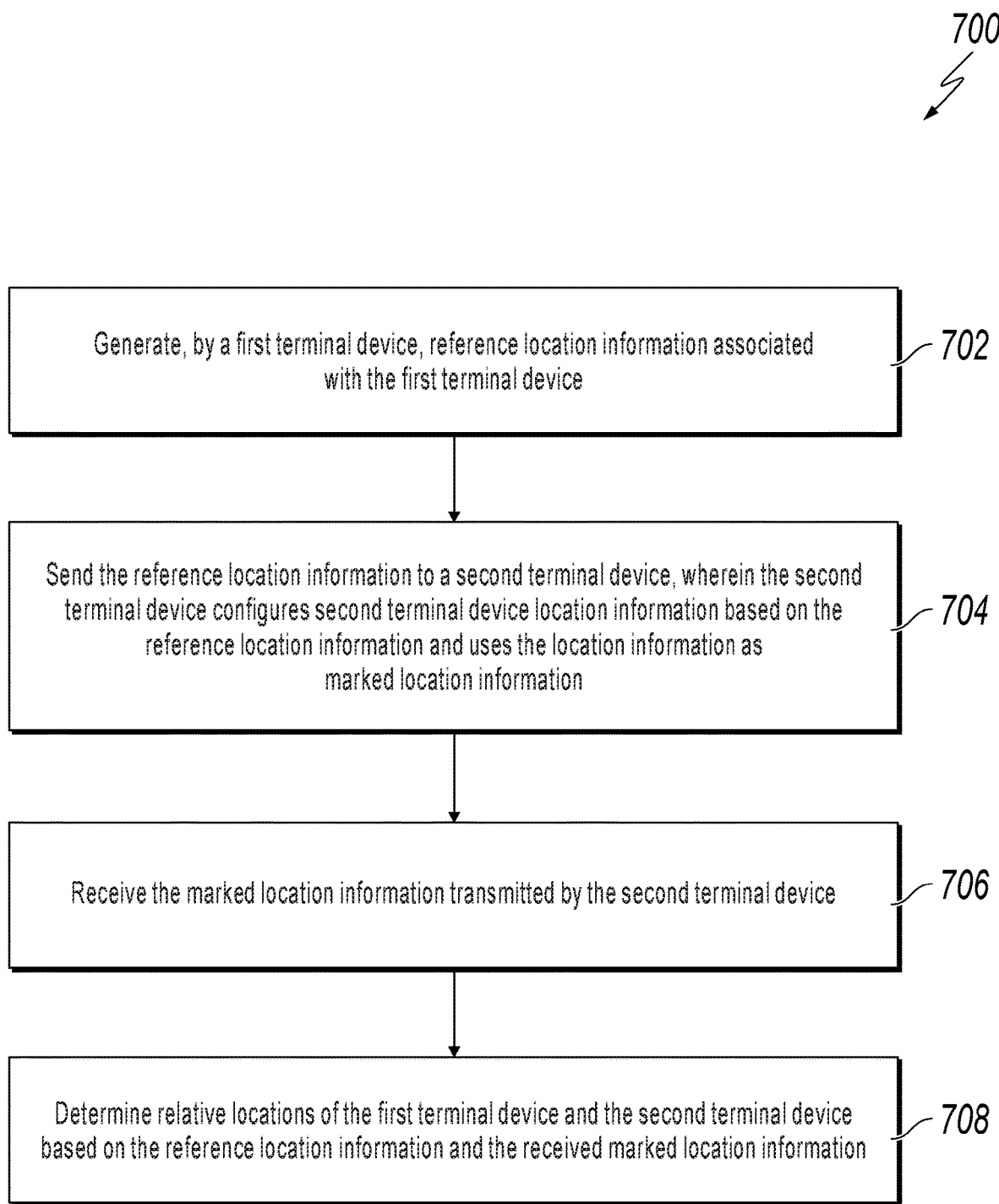
FIG. 7 is a flowchart illustrating an example of a computer-implemented method for determining relative locations of terminal devices, according to an implementation of the present disclosure.

FIG. 7 is a flowchart illustrating an example of a computer-implemented method 700 for determining relative locations of terminal devices, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, reference location information associated with the first terminal device is generated by a first terminal device. In some implementations, the generating includes generating, by the first terminal device, the reference location information of the first terminal device in a positioning interface. In some implementations, the positioning interface includes a coordinate system, the generating is based on an origin of the coordinate system, and the first terminal device uses the origin of the coordinate system as a reference location of the first terminal device. From 702, method 700 proceeds to 704.

At 704, the reference location information is sent to a second terminal device. The second terminal device configures second terminal device location information based on the reference location information and uses the location information as marked location information. In some implementations the sending includes: determining, by the first terminal device, a group including the first terminal; transmitting the reference location information to each second terminal device in the group; determining, by the first terminal device and based on the received marked location information, relative locations of the first terminal device and each second terminal device in the group; and sending the determined relative location of each second terminal device to all second terminal devices in the group. In some implementations, the sending includes sending the positioning interface to the second terminal device. In some implementations, the sending includes sending a positioning interface including the reference location information to the second terminal device. From 704, method 700 proceeds to 706.

At 706, the marked location information transmitted by the second terminal device is received by the first terminal device. In some implementations, receiving the marked location information sent by the second terminal device includes receiving a positioning interface transmitted by the second terminal device, wherein the positioning interface includes the marked location information associated with the second terminal device. From 706, method 700 proceeds to 708.

At 708, relative locations of the first terminal device and the second terminal device are determined based on the reference location information and the received marked location information. In some implementations, after the determining: information is transferred between the terminal devices in a specific sequence based on the relative locations of the terminal devices, or a specific image is displayed with the terminal devices based on the relative locations of the terminal devices. After 708, method 700 stops.

Implementations of the subject matter described in this specification can be implemented so as to realize particular advantages or technical effects. For example, the described subject matter can be used to determine a relative location of a terminal device by obtaining relative locations of a plurality of terminal devices without a need of using a specific terminal device. Using the terminal device, a user can obtain various services provided by an online system (for example, a website) and can also interact with other users, particularly using location data. Due to limited precision of positioning data provided by positioning services, terminal devices close to each other may obtain the same absolute location. Consequently, relative locations of the terminal devices cannot be differentiated. The described subject matter permits more accurate location determination for each terminal device to permit each terminal device to be differentiated from other terminal devices.

The described determination of terminal device relative locations can ensure the efficient usage of computer resources (for example, processing cycles, network bandwidth, and memory usage) by permitting more precise location determination between terminal devices and position servers, reducing overall network transactions, reducing network transaction delay, and reducing a need for additional positional calculations by both a terminal devices and position servers. In some cases, network transactions can be optimized and made more secure by targeting the network transactions to particular locations. The described subject matter can be used to enhance service efficiency and integrity, increase overall service/transaction speed, reduce data usage, and reduce network bandwidth, network congestion, computational cycles (for example, both on clients and servers), and data storage requirements (either persistent or transitory).

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
generating, by a first terminal device, reference location information associated with the first terminal device;
determining, by the first terminal device, a group comprising the first terminal device and one or more second terminal devices;
sending, by the first terminal device, the reference location information to each second terminal device of the one or more second terminal devices in the group, wherein each second terminal device configures corresponding second terminal device location information based on the reference location information, and uses the corresponding second terminal device location information as corresponding marked location information;
receiving, by the first terminal device, the corresponding marked location information transmitted by each second terminal device;
determining, by the first terminal device, a relative location of the first terminal device and a relative location of each second terminal device based on the reference location information and based on the corresponding marked location information received from each second terminal device; and
sending, by the first terminal device, the relative location of each second terminal device to all second terminal devices in the group.

2. The computer-implemented method of claim 1, wherein the generating comprises generating by the first terminal device in a positioning interface comprising a coordinate system and based on an origin of the coordinate system, the reference location information of the first terminal device, wherein the first terminal device uses the origin of the coordinate system as a reference location of the first terminal device.

3. The computer-implemented method of claim 1, wherein the sending the reference location information to each second terminal device in the group comprises sending a positioning interface comprising the reference location information to each second terminal device.

4. The computer-implemented method of claim 1, wherein receiving the corresponding marked location information sent by each second terminal device comprises receiving a corresponding positioning interface transmitted by each second terminal device, wherein the corresponding positioning interface comprises the corresponding marked location information associated with each second terminal device.

5. The computer-implemented method of claim 1, wherein:
the generating comprises generating, by the first terminal device, the reference location information of the first terminal device in a positioning interface;
the sending the reference location information to each second terminal device in the group comprises sending the positioning interface to each second terminal device; and
the receiving comprises receiving a corresponding second positioning interface transmitted by each second terminal device, wherein the corresponding second positioning interface comprises the corresponding marked location information associated with each second terminal device.

6. The computer-implemented method of claim 1, further comprising:
after determining the relative location of the first terminal device and the relative location of each second terminal device:
transferring information between terminal devices in the group in a specific sequence based on the relative location of the first terminal device and the relative location of each second terminal device; or
displaying a specific image with the terminal devices based on the relative location of the first terminal device and the relative location of each second terminal device.

7. A non-transitory, computer-readable medium storing one or more instructions executable by a computer system to perform operations comprising:
generating, by a first terminal device, reference location information associated with the first terminal device;
determining, by the first terminal device, a group comprising the first terminal device and one or more second terminal devices;
sending, by the first terminal device, the reference location information to each second terminal device of the one or more second terminal devices in the group, wherein each second terminal device configures corresponding second terminal device location information based on the reference location information, and uses the corresponding second terminal device location information as corresponding marked location information;
receiving, by the first terminal device, the corresponding marked location information transmitted by each second terminal device;
determining, by the first terminal device, a relative location of the first terminal device and a relative location of each second terminal device based on the reference location information and based on the corresponding marked location information received from each second terminal device; and
sending, by the first terminal device, the relative location of each second terminal device to all second terminal devices in the group.

8. The non-transitory, computer-readable medium of claim 7, wherein the generating comprises generating, by the first terminal device in a positioning interface comprising a coordinate system and based on an origin of the coordinate system, the reference location information of the first terminal device, wherein the first terminal device uses the origin of the coordinate system as a reference location of the first terminal device.

9. The non-transitory, computer-readable medium of claim 7, wherein the sending the reference location information to each second terminal device in the group comprises sending a positioning interface comprising the reference location information to each second terminal device.

10. The non-transitory, computer-readable medium of claim 7, wherein receiving the corresponding marked location information sent by each second terminal device comprises receiving a corresponding positioning interface transmitted by each second terminal device, wherein the corresponding positioning interface comprises the corresponding marked location information associated with each second terminal device.

11. The non-transitory, computer-readable medium of claim 7, wherein:
the generating comprises generating, by the first terminal device, the reference location information of the first terminal device in a positioning interface;
the sending the reference location information to each second terminal device in the group comprises sending the positioning interface to each second terminal device; and
the receiving comprises receiving a corresponding second positioning interface transmitted by each second terminal device, wherein the corresponding second positioning interface comprises the corresponding marked location information associated with each second terminal device.

12. The non-transitory, computer-readable medium of claim 7, the operations further comprising:
after the determining the relative location of the first terminal device and the relative location of each second terminal device:
transferring information between terminal devices in the group in a specific sequence based on the relative location of the first terminal device and the relative location of each second terminal device; or
displaying a specific image with the terminal devices based on the relative location of the first terminal device and the relative location of each second terminal device.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
generating, by a first terminal device, reference location information associated with the first terminal device;
determining, by the first terminal device, a group comprising the first terminal device and one or more second terminal devices;
sending, by the first terminal device, the reference location information to each second terminal device of the one or more second terminal devices in the group, wherein each second terminal device configures corresponding second terminal device location information based on the reference location information, and uses the corresponding second terminal device location information as corresponding marked location information;
receiving, by the first terminal device, the corresponding marked location information transmitted by each second terminal device;
determining, by the first terminal device, a relative location of the first terminal device and a relative location of each second terminal device based on the reference location information and based on the corresponding marked location information received from each second terminal device; and
sending, by the first terminal device, the relative location of each second terminal device to all second terminal devices in the group.

14. The computer-implemented system of claim 13, wherein the generating comprises generating, by the first terminal device in a positioning interface comprising a coordinate system and based on an origin of the coordinate system, the reference location information of the first terminal device, wherein the first terminal device uses the origin of the coordinate system as a reference location of the first terminal device.

15. The computer-implemented system of claim 13, wherein the sending the reference location information to each second terminal device in the group comprises sending a positioning interface comprising the reference location information to each second terminal device.

16. The computer-implemented system of claim 13, wherein receiving the corresponding marked location information sent by each second terminal device comprises receiving a corresponding positioning interface transmitted by each second terminal device, wherein the corresponding positioning interface comprises the corresponding marked location information associated with each second terminal device.

17. The computer-implemented system of claim 13, wherein:
the generating comprises generating, by the first terminal device, the reference location information of the first terminal device in a positioning interface;
the sending the reference location information to each second terminal device in the group comprises sending the positioning interface to each second terminal device; and
the receiving comprises receiving a corresponding second positioning interface transmitted by each second terminal device, wherein the corresponding second positioning interface comprises the corresponding marked location information associated with each second terminal device.

* * * * *